Figure 1:
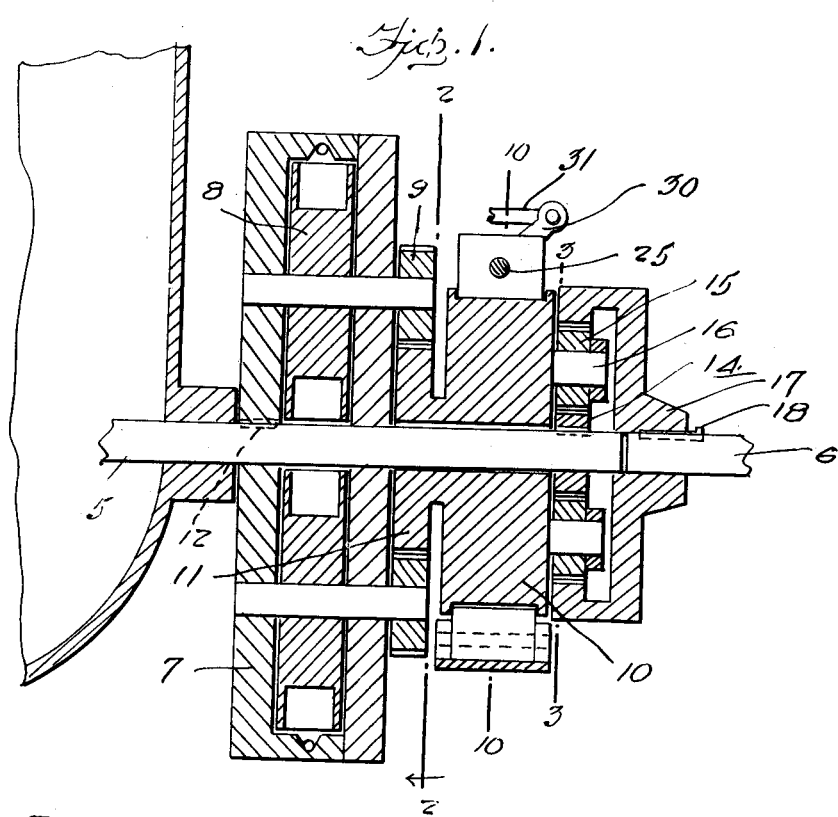

March 18, 1930.  K. J. STRIGL  1,750,787
TRANSMISSION MECHANISM
Filed July 6, 1928  4 Sheets-Sheet 1

Inventor
Karl J. Strigl

By Clarence A. O'Brien
Attorney

March 18, 1930.                 K. J. STRIGL                 1,750,787
                          TRANSMISSION MECHANISM
                            Filed July 6, 1928            4 Sheets-Sheet 2
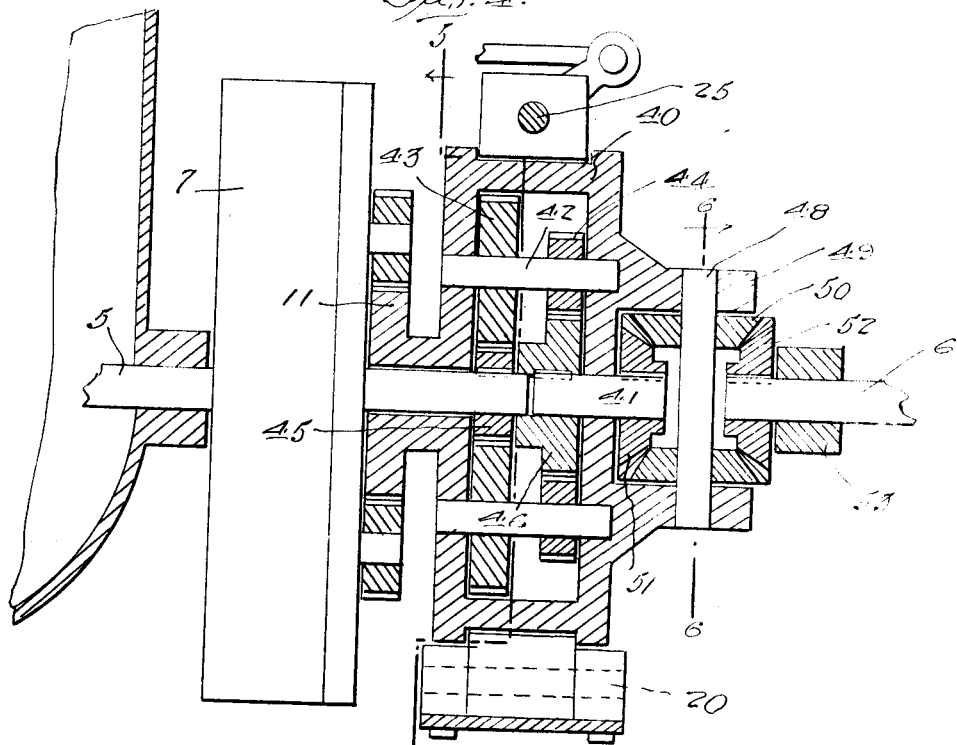
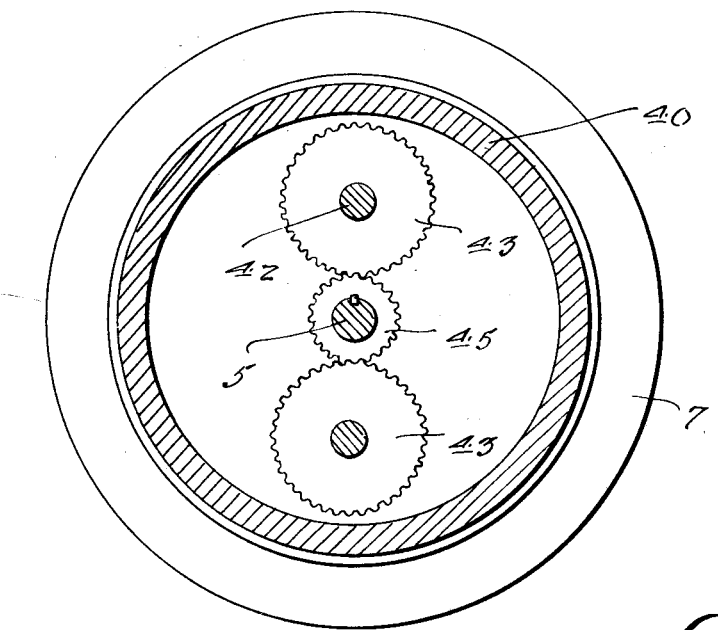
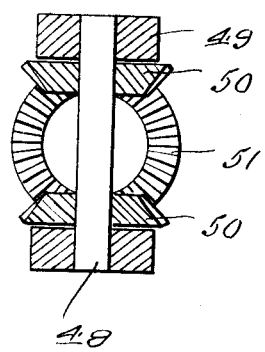
Inventor
Karl J. Strigl March 18, 1930.　　　　K. J. STRIGL　　　　1,750,787
TRANSMISSION MECHANISM
Filed July 6, 1928　　　　4 Sheets-Sheet 3
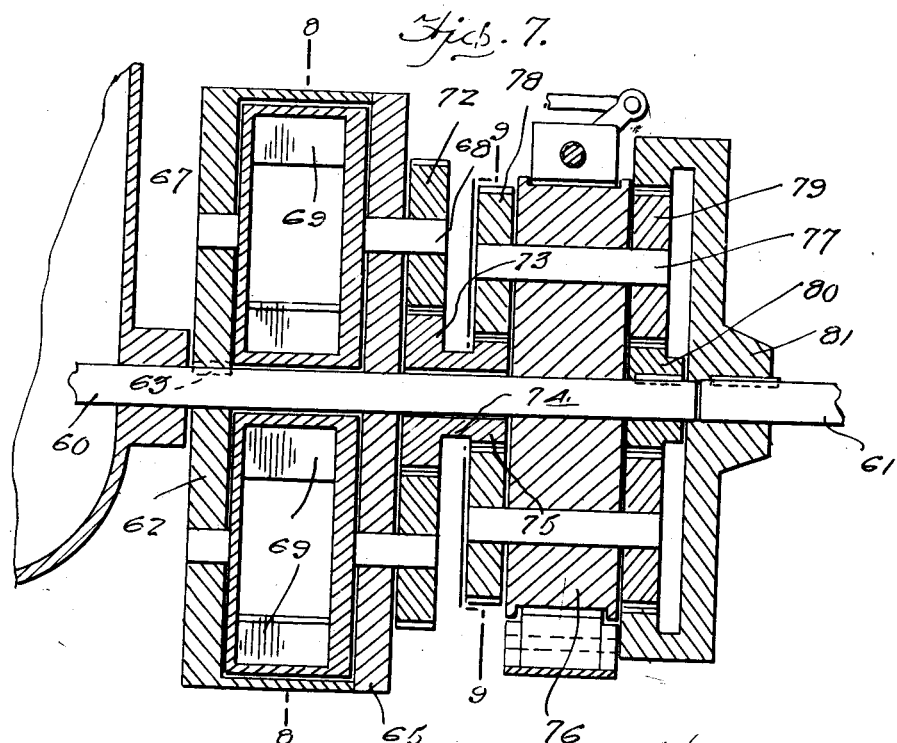
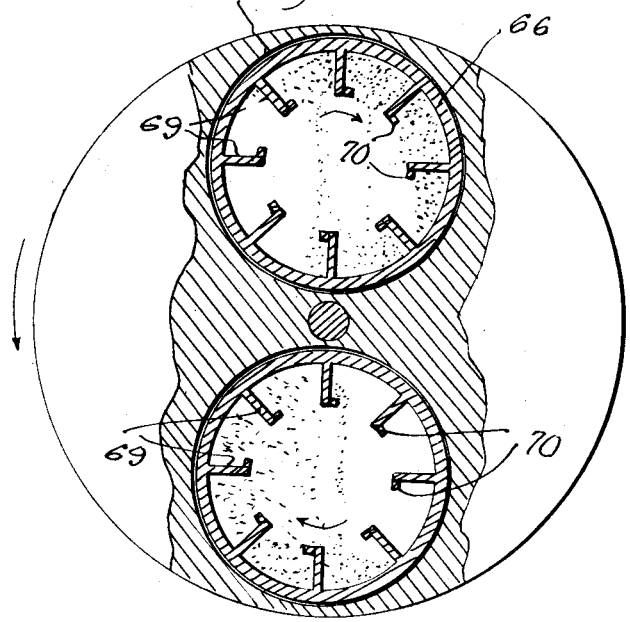
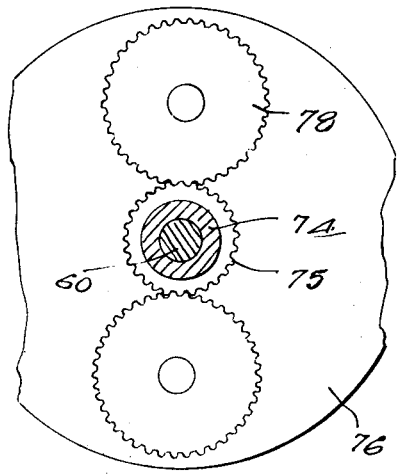
Inventor
Karl J. Strigl
By Clarence A. O'Brien
Attorney March 18, 1930. K. J. STRIGL 1,750,787
TRANSMISSION MECHANISM
Filed July 6, 1928 4 Sheets-Sheet 4
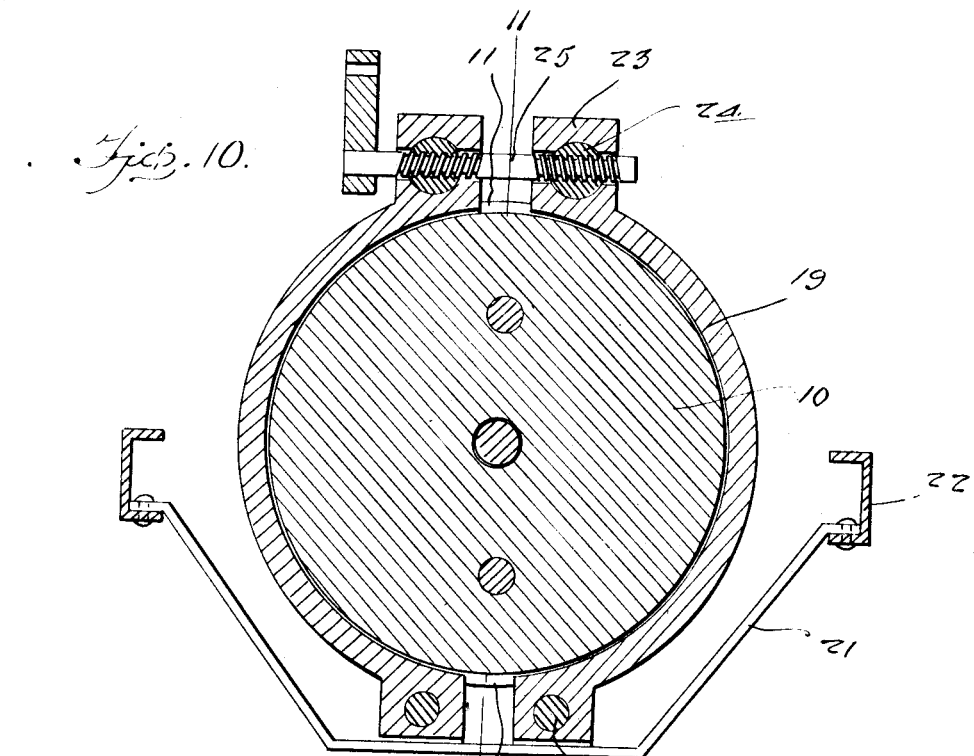
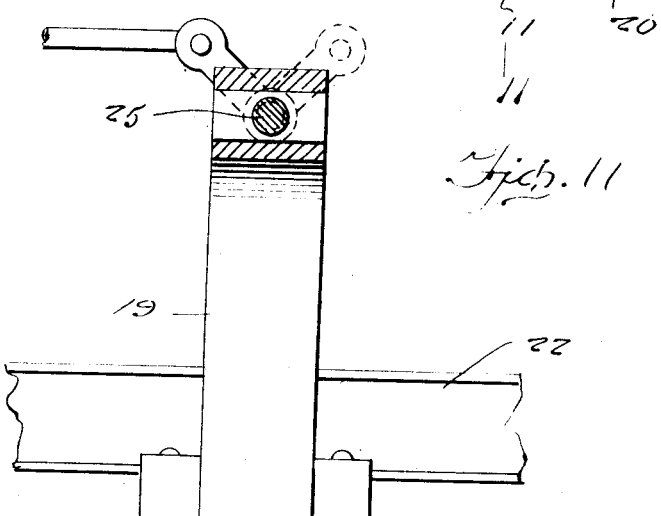
Inventor
Karl J. Strigl
By Clarence A. O'Brien
Attorney Patented Mar. 18, 1930

1,750,787

UNITED STATES PATENT OFFICE

KARL JOSEF STRIGL, OF NEW YORK, N. Y.

TRANSMISSION MECHANISM

Application filed July 6, 1928. Serial No. 290,721.

The present invention relates to a transmission mechanism and has for its prime object to provide in combination with a centrifugal force operated transmission mechanism of reversing mechanism which is comparatively simple in its construction, easy to manipulate, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
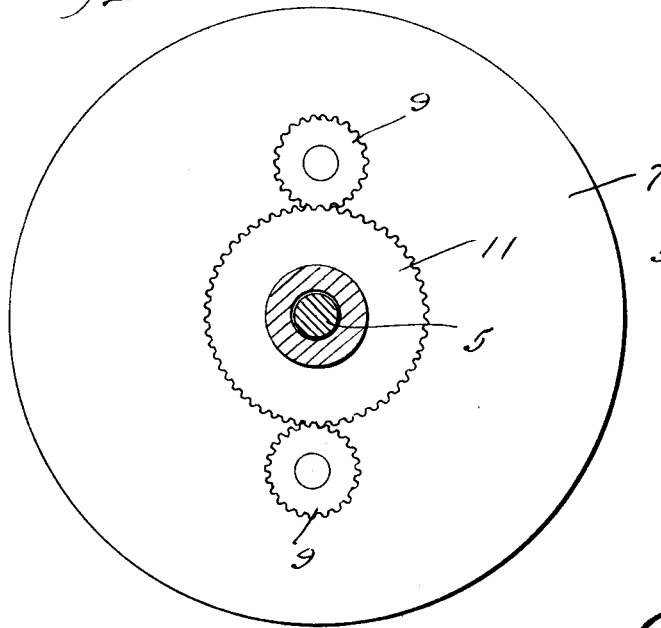
Figure 3:
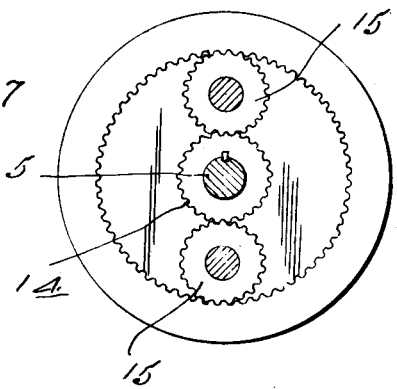

In the drawing:

Figure 1 is a longitudinal section through one embodiment of my improved transmission mechanism, Figure 2 is a transverse section therethrough taken substantially on the line 2—2 of Figure 1, Figure 3 is a transverse section taken substantially on the line 3—3 of Figure 1, Figure 4 is a longitudinal section through another embodiment of the invention, Figure 5 is a transverse section taken substantially on the line 5—5 of Figure 4, Figure 6 is a transverse section taken substantially on the line 6—6 of Figure 4, Figure 7 is a longitudinal section through still another embodiment of the invention, Figure 8 is a transverse section taken substantially on the line 8—8 of Figure 7, Figure 9 is a transverse section taken substantially on the line 9—9 of Figure 7, Figure 10 is a transverse section taken substantially on the line 10—10 of Figure 1, and Figure 11 is a section taken substantially on the line 11—11 of Figure 10 showing the brake band and supporting structure only.

Referring to the drawing in detail and referring particularly to Figures 1, 2, 3, 4 and 5 it will be seen that the numeral 5 denotes a driving shaft and the numeral 6 a driven shaft. The numeral 7 denotes a fly wheel of the type disclosed in Letters Patent No. 1,666,152 issued to me on April 17, 1928, and embodies centrifugal force control means 8 therein for retarding the rotation of gears 9 about their axes.

A drum like block 10 is rotatable on the driving shaft 5 and has a gear 11 formed concentrically therewith at one side meshing with the gears 9. The fly wheel 7 is keyed to the driving shaft 5 as is indicated at 12.

A pinion 14 is keyed to the driving shaft 5 and meshes with pinions or gears 15 on axles 16 projecting from the other side of the drum like block 10. An internal gear 17 is keyed as at 18 on the driven shaft 6 and meshes with the pinions 15.

A brake band is disposed about the drum like block 10 and includes sections 19 rockable on pins 20 carried by supporting cradles 21 between the side bars of the chassis 22. The free ends of the sections 19 terminate in ears 23 having cylinders 24 rockable therein and a shaft 25 is operatively threaded through the cylinders so that by rocking this shaft 25 the band sections may be tightened or loosened about the drum like block 10.

From the above detailed description it will be seen that when the shaft 5 is rotating at what may be termed an idling speed the fly wheel 7 rotates therewith as does also the gear 14. The drum like block 10 is free to rotate and the gears 9 are free to rotate and since there will be a certain load on the driven shaft 6 said driven shaft 6 will remain stationary.

As soon as the shaft 5 starts to rotate at the speed greater than idling speed, the centrifugal force set up in the means 8 will tend to retard the rotation of the gears 9 so as to increase the rotary motion to the drum like block 10 through gear 11, thereby causing the drum like block 10 to gain higher rate of speed until the speed difference is equalized with that of the fly wheel, and thereby the rotary motion will be imparted to the internal gear 17 and the driven shaft 6.

Obviously as the centrifugal force is increased in accordance with the increase of speed of the shaft 5 the ratio of the rotation of the shaft 6 with respect to the shaft 5 will increase until it becomes one to one.

A crank 30 is provided on the shaft 25 and is operable by a rod 31 from a foot pedal located among the usual gas and brake pedals of an automobile so that when it is desired to reverse the automobile that is reverse the direction of rotation of the driven shaft 6 the crank 30 is caused to be rocked to draw the ears 23 toward each other and thereby brake and stop the drum like block 10 so that the gear 14 causes the rotation of the pinions 15 on their now stationary stub axle 16 thereby rotating the internal gear 17 and the driven shaft 6 in an opposite direction to the shaft 5.

From the above detailed description it will be seen that when going forward the speed of the motor is increased by opening the throttle and the centrifugal resistance begins to snap all the interior parts causing the transmission to be directly coupled.

It will further be seen that the reversing mechanism may be utilized for the purpose of braking the vehicle but this should be used only in case of emergency.

Referring now in detail to the embodiment of the invention disclosed in Figures 4, 5 and 6 it will be seen that a drum 40 has formed therewith the gear 11 operating in conjunction with the centrifugal resistance controlled transmission mechanism in fly wheel 7 as set forth above. This drum 40 is hollow and is rotatable on driving shaft 5 and an intermediate driven shaft 41.

A plurality of axles 42 extend across the interior of the drum 40 off center thereof and each axle has thereon a gear 43 and a pinion 44. A gear 45 is keyed to the end of the driving shaft 5 and meshes with the gears 43. A gear 46 is keyed on one end of the intermediate driven shaft 41 and meshes with pinions 44.

An axle 48 is disposed in ears 49 projecting from one side of the drum 40 so as to be at a right angle to shaft 5 and 41 and this axle has thereon gears of the bevel type 50 meshing with bevel gears 51 on the other end of the intermediate shaft 41 and bevel gear 52 on driven shaft 6 journaled in a suitable bearing 53.

A suitable braking mechanism is associated with the drum 40 as described in connection with the previous embodiment. If the fly wheel 7 turns below or at idling speed about 300 R. P. M. the shaft 41 and gear 51 rotate about 75 R. P. M. and therefore this shaft 41 rotates in respect to the shaft 5 at the ratio of about four to one.

The drum 40 and the gear 11 rotate at about 37.5 R. P. M. while the driven bevel gear 52 does not rotate. Upon application of the brake mechanism the revolving of the drum 40 is stopped and the beveled gear 52 is caused to turn in opposite direction from the fly wheel 7 and then the car is in reverse at a ratio of about four to one. Going forwardly the brake mechanism, of course, is released and the speed of the motor is increased. The centrifugal resistance created will tend to stop all internal parts as well as all the gears so that the car is directly coupled.

Referring now to the third embodiment of the invention disclosed in Figures 7, 8 and 9 it will be seen that the numeral 60 denotes the driving shaft and the numeral 61 the driven shaft.

A fly wheel 62 is keyed to the driving shaft 60 as at 63 and is provided with a pair of annular chambers 64 one to each side of the center thereof and a cap plate 65 forms part of the fly wheel and closes one side of each chamber. Hollow wheels 66 are rotatable in the chambers by means of trunnions 67 and 68 and these wheels are provided with inwardly directed radiating vanes 69 having right angularly disposed end portions 70.

Buckshot, mercury or other equivalent weight material is disposed in the wheels 66 so that upon the fly wheel increasing its speed the centrifugal force created will throw the weighted mass such as the buck shot, mercury or the like outwardly and impede any rotation of the wheel 66 and this centrifugally set up impedance is utilized in obtaining different ratios in forward speed as will be more apparent as the description proceeds. On each trunnion 68 there is fixed a pinion 72 meshing with a pinion 73 on a hub 74 rotatable about the driving shaft 60 and also formed with a pinion 75.

Gears 78 are fixed on the forward ends of the shaft 77 and gears 79 are fixed on the rear ends thereof. The gears 78 mesh with the pinion 75 while the gears 79 mesh with a pinion 80 keyed on the rear end of the driving shaft 60. An internal gear 81 is keyed on the driven shaft 61 and meshes with the gears 79.

A suitable braking mechanism is associated with the drum like box 76 similar to that shown in Figures 10 to 11. When the transmission is in neutral and the internal gear 81 is stopped, the drive shaft rotates at about 200 R. P. M. while the drum like block 76 turns at 40 R. P. M. causing gears 73 and 75 to turn at 216 R. P. M. which is sixteen revolutions faster than the fly wheel.

The drum like fin wheels turn comparatively very slowly only 16 R. P. M. With the amount of mass, the centrifugal force is unable to move the car while the motor makes slow revolution.

In reverse, as described in other embodiments the brake is applied on the drum like block 76 causing this block to stop and forcing the internal gear 81 to turn in opposite directions thus placing the car in reverse at the ratio of 4 to 1.

In going forward, of course, the brake is released and the speed increased in any well known manner and the centrifugal force tends to stop the fin wheels 66 as well as the fender and counter gears and then the transmission is directly coupled.

When the motor has low horse power, it is advisable to have a lower gear on the driven shaft, for steep ascending. When the foot space is limited this device may be so constructed that the fly wheel remains directly behind the motor, while the hollow shaft is so far extended that the other parts are located under the driver's seat.

It is thought that the construction operation, utility and advantages of this invention will now be clearly understood by those skilled in this art without a more detail description thereof. The present embodiments of the invention have been disclosed in considerable detail merely for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a drive shaft, a driven shaft, a fly wheel rotatable with the drive shaft, control members on the fly wheel for retarding the same under influence of centrifugal action, a brake drum rotatably mounted on the drive shaft, a gear carried by one end of the drum, planetary gears on the fly wheel for mesh with the gear carried by the drum, a brake band for co-action with the drum, a ring gear carried by the driven shaft, smaller gears carried by the opposite end of the drum, a gear on the drive shaft for mesh with the gears on the last-mentioned end of the drum whereby reverse motion may be imparted to the driven shaft upon the retardation of the drum.

2. In combination, a pair of rotary shafts, one being the drive shaft and the other the driven shaft, a centrifugal resistance unit on one of the shafts, gears carried by said unit, a free brake drum adapted to be driven by said gears, retarding means for co-action with said drum, and gears between the drum and the other shaft for reversing the motion of the said last-mentioned shaft when the drum is stopped by said retarding means, said gears including a gear on the drive shaft, gears on the drum for mesh with the gear on the drive shaft, and a gear carried by the driven shaft for mesh with the last-mentioned gears.

In testimony whereof I affix my signature.

KARL JOSEF STRIGL.